United States Patent
McGrath (10) Patent No.: US 9,997,827 B2
(45) Date of Patent: Jun. 12, 2018

(54) WIDEBAND ARRAY ANTENNA AND MANUFACTURING METHODS

(71) Applicant: Raytheon Company, Waltham, MA (US)

(72) Inventor: Daniel T. McGrath, Mckinney, TX (US)

(73) Assignee: RAYTHEON COMPANY, Waltham, MA (US)

(*) Notice: Subject to any disclaimer, the term of this patent is extended or adjusted under 35 U.S.C. 154(b) by 43 days.

(21) Appl. No.: 15/059,663

(22) Filed: Mar. 3, 2016

(65) Prior Publication Data

US 2017/0256848 A1 Sep. 7, 2017

(51) Int. Cl.
| | |
|---|---|
| *H01Q 1/36* | (2006.01) |
| *H01Q 13/10* | (2006.01) |
| *H01Q 9/00* | (2006.01) |
| *H01Q 13/08* | (2006.01) |
| *H01Q 5/30* | (2015.01) |
| *H01Q 1/12* | (2006.01) |
| *H01Q 21/00* | (2006.01) |
| *H01Q 21/06* | (2006.01) |
| *B33Y 10/00* | (2015.01) |
| *B33Y 80/00* | (2015.01) |

(52) U.S. Cl.
CPC ............... *H01Q 1/36* (2013.01); *H01Q 1/12* (2013.01); *H01Q 5/30* (2015.01); *H01Q 9/005* (2013.01); *H01Q 13/085* (2013.01); *H01Q 13/106* (2013.01); *H01Q 21/0025* (2013.01); *H01Q 21/0075* (2013.01); *H01Q 21/0087* (2013.01); *H01Q 21/064* (2013.01); *H01Q 21/067* (2013.01); *B33Y 10/00* (2014.12); *B33Y 80/00* (2014.12)

(58) Field of Classification Search
CPC ........... H01Q 21/0025; H01Q 21/0075; H01Q 21/0093; H01Q 21/064; H01Q 9/005; H01Q 13/085; H01Q 13/106
See application file for complete search history.

(56) References Cited

U.S. PATENT DOCUMENTS

| | | |
|---|---|---|
| 2003/0214450 A1 | 11/2003 | Lynch et al. |
| 2005/0088353 A1 | 4/2005 | Irion, II et al. |
| 2006/0044189 A1 | 3/2006 | Livingston et al. |

(Continued)

OTHER PUBLICATIONS

Henrik Holter, "Dual-Polarized Broadband Array Antenna With BOR-Elements, Mechanical Design and Measurements", EE Transactions on Antennas and Propagation, vol. 55, No. 2, Feb. 2007, pp. 305-312, 8 pages.

(Continued)

*Primary Examiner* — Hoang Nguyen
(74) *Attorney, Agent, or Firm* — Cantor Colburn LLP (57) ABSTRACT

A base block of a flare antenna may be made by: forming a ground plane on a base insulating layer; forming an intermediate insulating layer over the ground plane; patterning radiating and shorting traces on the intermediate insulating layer; forming a top insulating layer over the radiating and shorting traces; forming a top metallization layer; connecting the top metallization layer to the ground plane with vias passing through the intermediate insulating layer; and forming a via that contacts the radiating trace and passes through the ground plane and is not in electrical contact with the top metallization layer or the ground plane.

4 Claims, 7 Drawing Sheets

(56) References Cited

U.S. PATENT DOCUMENTS

2009/0322636 A1 12/2009 Brigham et al.

OTHER PUBLICATIONS

Notification of Transmittal of the International Search Report of the International Searching Authority, or the Declaration; PCT/US2016/067919; dated Mar. 16, 2017, 6 pages.
Notification of Transmittal of the International Written Opinion of the International Searching Authority, or the Declaration; PCT/US2016/067919; dated Mar. 16, 2017, 12 pages.

WIDEBAND ARRAY ANTENNA AND MANUFACTURING METHODS

BACKGROUND

The subject matter disclosed herein relates to antennas and, more particularly, to wideband array radiators.

The design and fabrication of high-performance antennas present challenges in the implementation. Important antenna design requirements are wide bandwidth and dual polarization. Other typical design requirements that have been considered in the literature are high directivity as well as small size and ease of manufacturing.

One approach is to form wideband, dual-polarized arrays. A few examples are described below and have generally operated at frequencies of 18 GHz and below. Examples are arrays of flared notches or flared dipoles. Both of these require, for dual polarization, "egg crate" style construction with conductive joints at unit cell boundaries. Millimeter wave versions (e.g., high frequency) have not been attempted due to the difficulties of building the egg crate structure to the requisite tolerances and in forming the conductive joints.

Another approach is a so-called "current sheet" array. These arrays include capacitively-coupled dipoles on a planar layer suspended above a ground sheet by spacers that include the dipole feeds. The spacers are either posts containing multiple coaxial feedthroughs or egg crate assemblies of dielectric cards containing printed feed lines. Millimeter wave version has not been attempted due the high precision required to align the various structures to maintain electrical continuity.

Another type of array includes transverse electromagnetic (TEM) flare antennas. The antennas of such arrays may be referred to as flares or pyramids. In these array types, waves are launched from a conductor (e.g., an inner conductor of a coaxial cable) bridging the gaps between adjacent pyramids. The pyramids are shaped so that the regions between have the shape of a tapered flare. Such antennas may have ultra-wide bandwidth (15:1 has been demonstrated); dual polarization; wide-angle scanning (75° from broadside in all planes has been demonstrated). Millimeter wave versions, however, would be difficult because of the mechanical tolerances in forming the pyramids and in mounting them precisely so that the gaps between them are consistent and present a consistent impedance to the feed lines.

SUMMARY

According to one embodiment, an antenna is disclosed. The antenna includes a base formed of at least two base blocks including a first base block and a second base block connected to one another. The first base block includes a ground plane, a top metallization layer and a second metallization between the ground plane and the top metallization layer. The base block further includes cage posts electrically connecting the ground plane and the top metallization layer, a shorting trace formed in the second metallization layer on first side of the first base block and a radiating trace formed in the second metallization layer on a second, opposite side of the first base block. The base block also includes a connection surrounded by the cage posts that connects the radiating trace to a wiring layer or connector and a shorting connection coupling the shorting trace to the top metallization layer. The antenna further includes two or more pyramids disposed on top of at the least two base blocks.

According to another embodiment, a base block for a flare antenna includes a ground plane, a top metallization layer and a second metallization between the ground plane and the top metallization layer and cage posts electrically connecting the ground plane and the top metallization layer. The block also includes a shorting trace formed in the second metallization layer on first side of the base block and a radiating trace formed in the second metallization layer on a second, opposite side of the base block. The antenna further includes a connection surrounded by the cage posts that connects the radiating trace to a wiring layer and a shorting connection coupling the shorting trace to the top metallization layer.

According to another embodiment, a method of forming a base block of a flare antenna includes: forming a ground plane on a base insulating layer; forming an intermediate insulating layer over the ground plane; patterning radiating and shorting traces on the intermediate insulating layer; forming a top insulating layer over the radiating and shorting traces; forming a top metallization layer; connecting the top metallization layer to the ground plane with vias passing through the intermediate insulating layer; and forming a via that contacts the radiating trace and passes through the ground plane and is not in electrical contact with the top metallization layer or the ground plane.

These and other advantages and features will become more apparent from the following description taken in conjunction with the drawings.

BRIEF DESCRIPTION OF THE DRAWINGS

The subject matter disclosed herein is particularly pointed out and distinctly claimed in the claims at the conclusion of the specification. The foregoing and other features and advantages are apparent from the following detailed description taken in conjunction with the accompanying drawings in which:

The detailed description explains embodiments of the invention, together with advantages and features, by way of example with reference to the drawings.

DETAILED DESCRIPTION

As described above, TEM flare antennas may be useful in certain applications due to their properties. However, difficulties related to fabrication of the feeds and precise positioning of adjacent pyramids may limit their application.

Figure 1A:
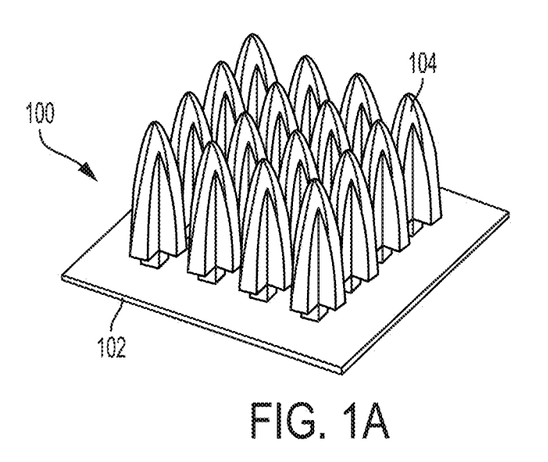
FIGS. 1a and 1b are, respectively, perspective and side views of a flare antenna.
Figure 1B:
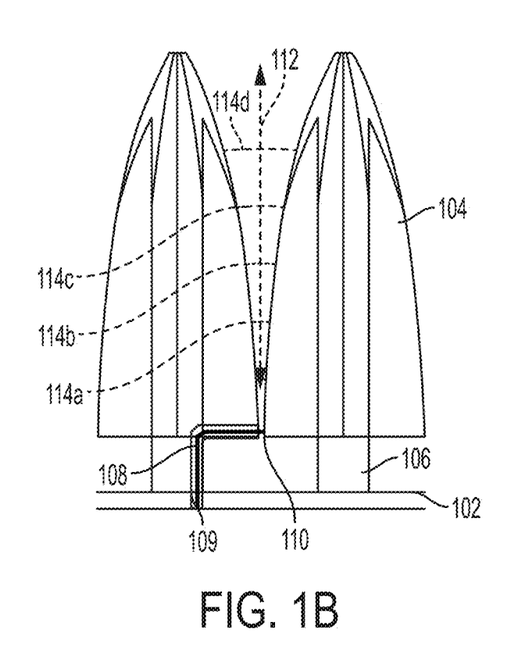

FIGS. 1a and 1b show perspective a side views of a prior art TEM flare antenna 100. This antenna 100 includes a plurality of pyramids 104. As shown in this example, the pyramids 104 are each mounted on a standoff post 106. The standoff post 106 physically separates the pyramids 104 from a ground plane 102.

A feed line in the form of coaxial cable 108 delivers a signal through the ground plane 102. The feed line 108 may receive a signal from a feed layer or line 111 that conveys a signal to/from the inner conductor and is located below the ground plane 102.

This signal is radiated out from an exposed end 110 of an inner conductor (e.g., wire 109) of the coaxial cable 108. The direction of signal radiation is generally shown by arrow 112. It shall be understood that the signal is guided outward in a path defined by wall of the pyramids 104. This is generally shown by propagation lines 114a-d.

Formation of such an antenna may be very difficult. Firstly, the feed line (coaxial cable 108) must be precisely formed and placed such that the exposed end 110 of the inner conductor 109 is located in a gap between adjacent pyramids 104. As discussed above, the exposed end 119 contacts an edge or base of an adjacent pyramid. Thus, to the extent that the feeds can be formed as needed, the pyramids 104 must still be precisely placed in order to allow for such contact and to achieve desired signal characteristics (e.g., polarization, bandwidth, scanning angle, etc.).

Disclosed herein is a modular system that may provide for the formation of TEM array. One embodiment is directed to the formation of feed layer on which any type or shape of pyramid may be placed. The feed layer is formed, in one embodiment, using standard printed wiring board (PWB) fabrication methods to form two or more blocks that are aligned adjacent one another. Each block includes an input that brings signals through a ground layer and a first dielectric substrate to a second metallization layer referred to as signal layer. The signal layer includes transmission lines (e.g., strip lines) formed of metal that pass the input signal to a strip line in an adjacent block. In the adjacent block, the signal is terminated on third metallization layer on which a pyramid may be located. The two strip lines mate and the metal on the third metallization is arranged such that as the mated lines cross gaps between metal in adjacent third metallization layers, the signal may radiate out in a manner as described above. The blocks may be formed using standard printed wiring board (PWB) techniques. Also disclosed are systems and methods of forming and arranging pyramids on the base. The pyramids may be formed using standard printed wiring board techniques.

Figure 2:
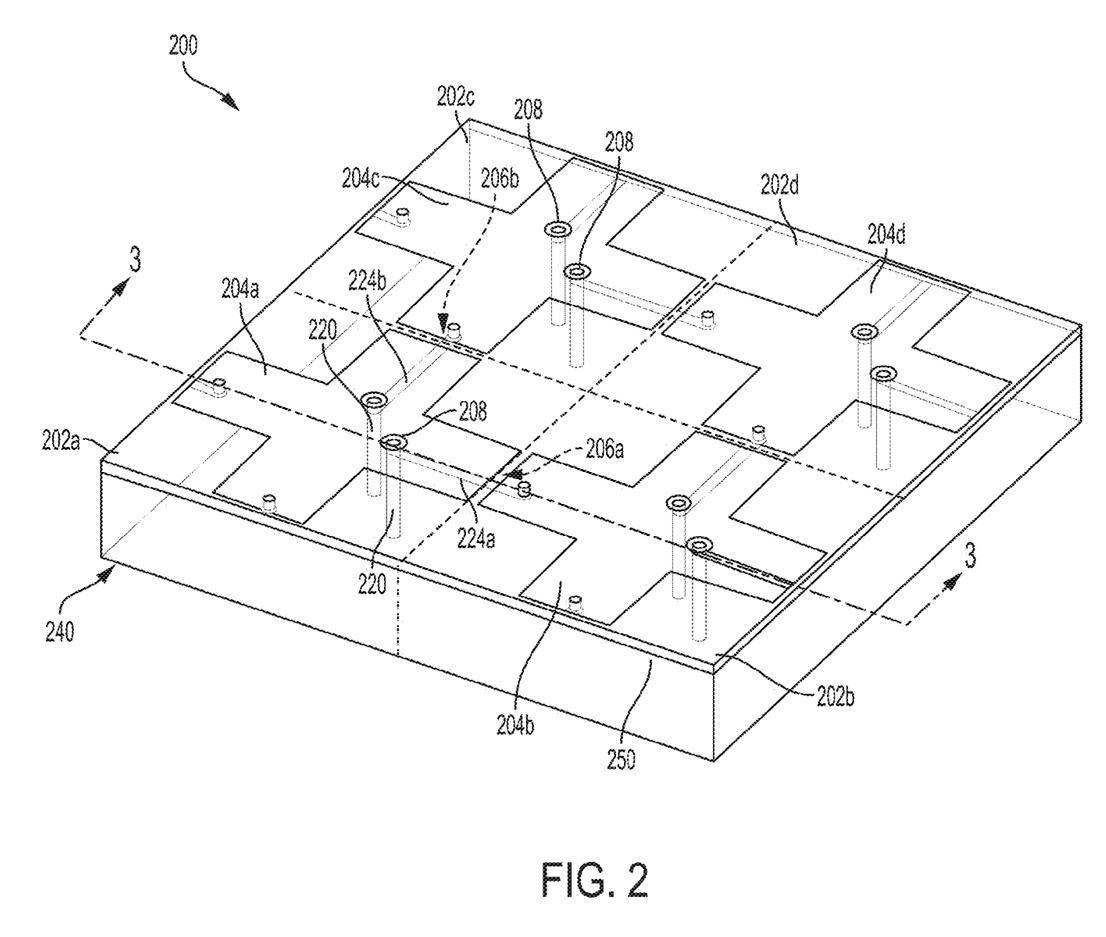
FIG. 2 is a perspective view of an example of a base plate including four base blocks according to one embodiment.

FIG. 2 shows a side view of base 200 that may form the base of an antenna array. As illustrated, the base includes four individual base blocks 202a-202d. In some cases, however, the base 200 may be formed as a single unit. Further, the number of base blocks 202 is not limited to four and may be selected based on the number of pyramids or flares that are required or otherwise selected for a particular application.

Each block 202 includes a top metallization element 204. In FIG. 2, each block 202a-202d includes a corresponding metallization element 204a-204d. The top metallization elements 204 may be referred to as a top or third metallization layer from time to time herein.

The top metallization element 204 may be shaped and arranged to receive or otherwise a contact a pyramid. For instance, one or more of the pyramids 104 may be placed on top of and in electrical contact with the metallization layer. That exact shape of the metallization layers may vary from the cross shaped elements shown in FIG. 2 without departing from the disclosure herein.

The top metallization element 204 may include, in one embodiment, one or more holes 208 formed therein. As further explained below, these holes are formed such that a signal conducting paths (vias) that brings the signals through a ground plane to signal layer can be formed in manner such that signal is not coupled to the metallization element 204.

The base 200 also includes a ground plane 240. The ground plane 240 serves as the ground plane for the antenna that may be formed using the base 200. The ground plane may be formed from a single metal sheet in one embodiment. The sheet may include holes (described below) that allow an input signal to be passed through it. The input signal is carried by conductors (shown in shadow) 220. As shown, the conductors 220 may be vias formed by drilling and plating. The conductors carry the signal to a second metallization layer 250 disposed between the ground plane 240 and the top metallization element 204. The second metallization layer 250 includes a radiating trace 224 that connects to another trace in an adjacent block. The radiating trace 224 as so configured will cause a signal to escape between pyramids formed on top of the metallization layer 204 at radiation gap 206. As more fully described below, the radiating trace 224 may be connected to another trace in an adjacent block and then coupled to the flare connected to that block. Electrically, such a connection will approximate the connection/operation as shown in FIG. 1b with trace 224 in the radiation gap 206 approximating the exposed end 110. Signal traces 224a and 224b, oriented perpendicular to each other couple to gaps 206a and 206b, respectively, also oriented perpendicular, to produce dual polarization.

Figure 3:
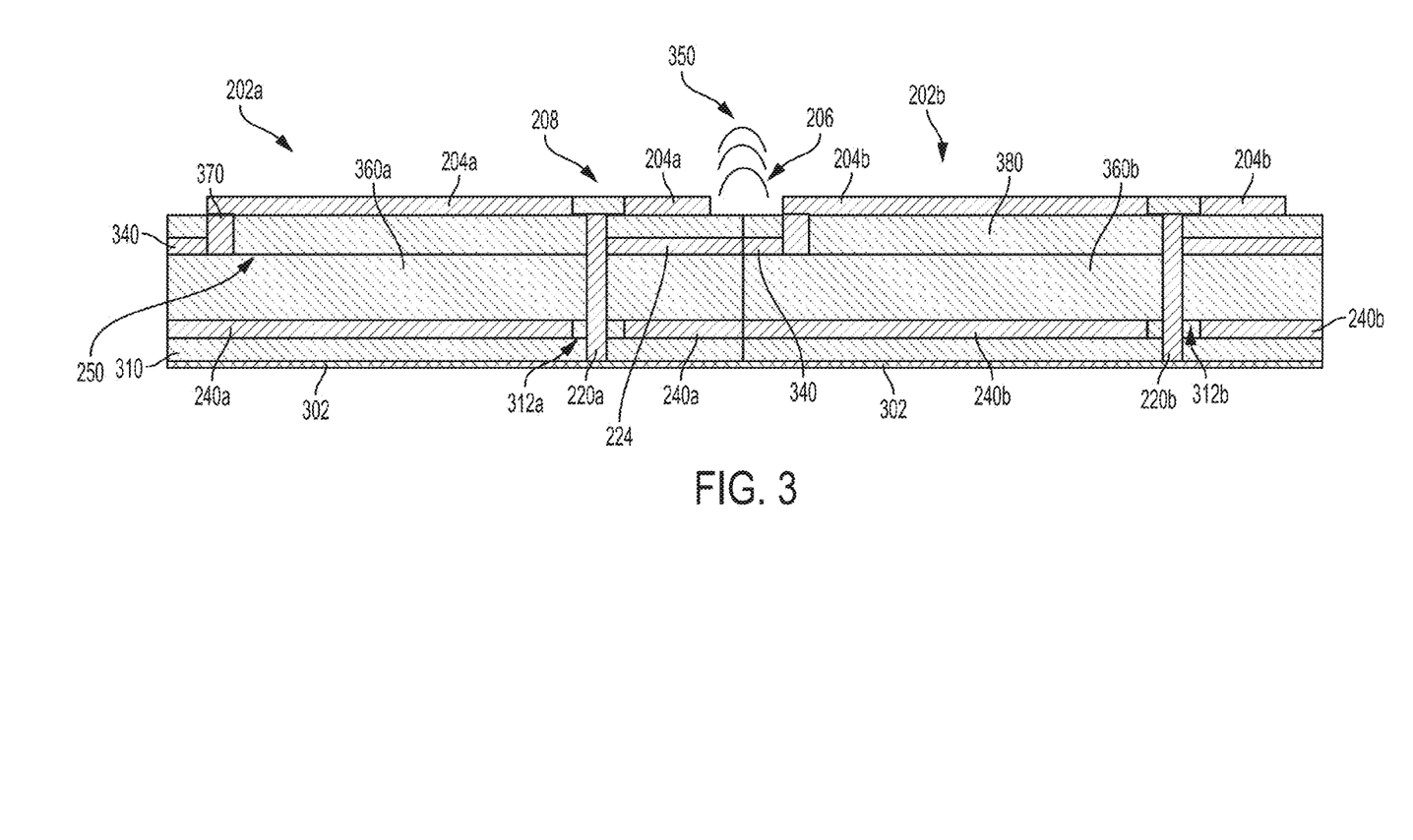
FIG. 3 is cross-section of the base plate of claim 2.
Figure 5:
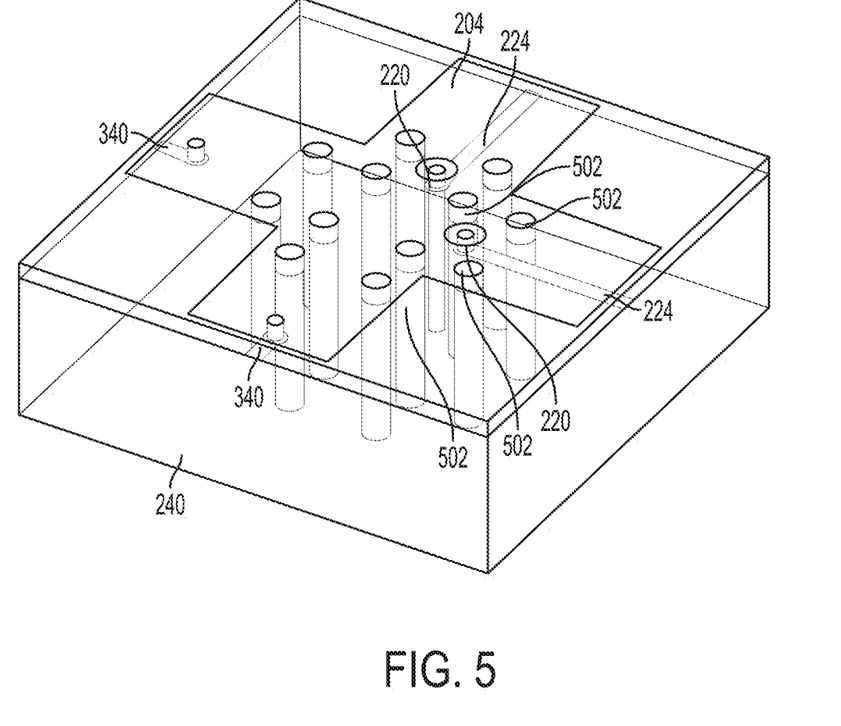
FIG. 5 is a perspective view of a base block according to one embodiment.

FIG. 3 shows a cross-section taken along 3-3 of FIG. 2. For clarity, both FIGS. 2 and 3 have been formed such they do not include surrounding vias 400 that form a cage (e.g., outer conductor of a coaxial cable) that are shown in FIG. 5 but the skilled artisan will realize that such may be included.

In FIG. 3, two adjacent blocks 202a, 202b are illustrated in cross-section. A bottom wiring layer is included that allows for a signal to be provided to the respective conductors 220a, 220b of each block. As above, each block 202a-202b includes a corresponding metallization element 204a-204b. The top metallization elements 204 may be referred to as a top or third metallization layer from time to time herein.

The metallization layers 204a, 204b may be formed and arranged such that the radiation gap 206 is formed between adjacent metallization elements 204. The top metallization element 204 may include, in one embodiment, one or more holes 208 formed therein. These holes may be filled with an insulating material and isolate the input signal on conductors 220a, 220b, from their respective metallization layers 204a, 204b.

Each block 202a, 202b also includes a ground plane 240. The ground plane 240 serves as the ground plane for the antenna(s) that may be formed using blocks 202a, 202b. The ground plane 240 may be formed from a single metal sheet in one embodiment and may be formed on top of an insulating layer 310. When assembled, the insulating layer 310 insulates the ground plane 240 from the wiring layer 302. The ground plane 240, 240b includes holes 312a, 312b that allow an input signal to be passed through it. The input signal is carried by conductors 220. As shown, the conductors 220 may be vias formed by drilling and plating. The conductors 220a, 220b carry the signal to a second metallization layer 250 disposed between the ground plane 240 and the top metallization layer 204. The second metallization layer 250 includes a radiating trace 224 that connects to another trace (shorting trace 340) in an adjacent block. The radiating trace 224 as so configured will cause a signal (e.g., signal 350) to escape between pyramids formed on top of the metallization layer 204 at radiation gap 206. As illustrated, the shorting trace 340 is electrically coupled to the top metallization layer 204b.

In operation, a signal may be provided through wiring layer 302 to a conductor 220a. That signal passes through the ground plane 240 at hole 312a and then is provided to radiating trace 224. The signal is then provided to the metallization layer 204b of an adjacent block 202b through shorting trace 340. Such a configuration can be made by any two blocks.

It shall be understood that the wiring layer 310 may be separate from the blocks in one embodiment and the blocks placed on top of it. In another embodiment, the blocks may be formed directly on top of the wiring layer. In another embodiment the conductors 220 may attach to connectors mounted to the underside of the ground plane 240, with layer 302 absent.

Figure 4:
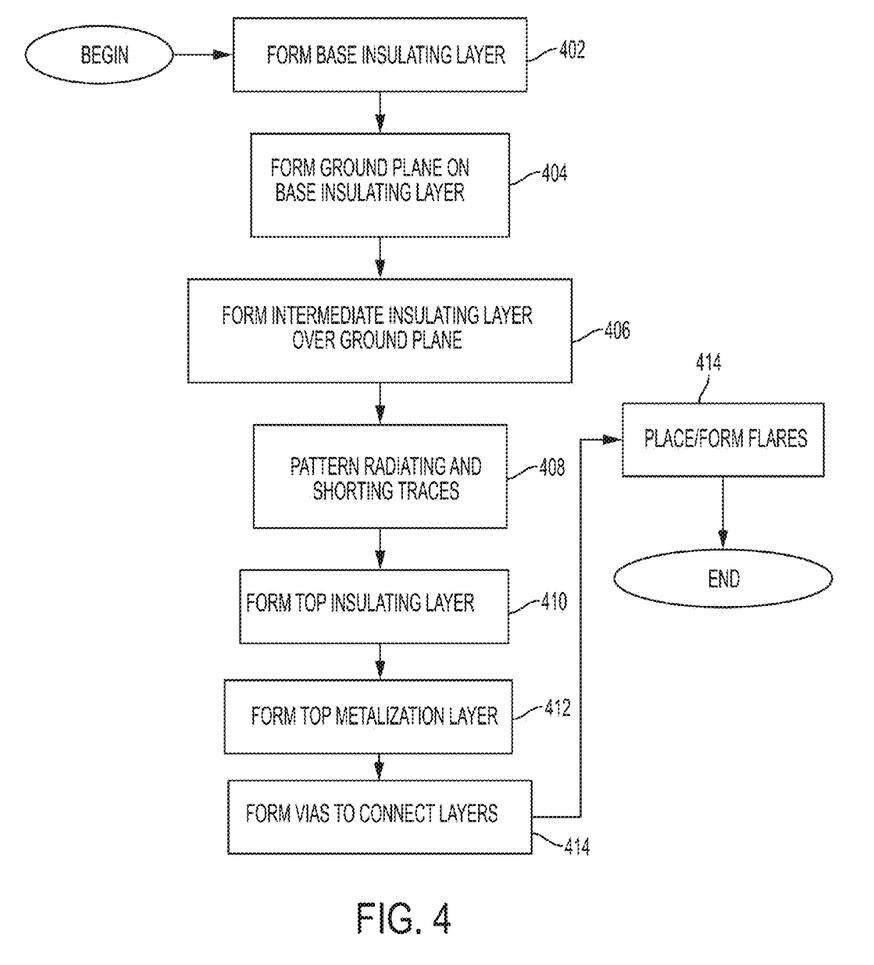
FIG. 4 is flow-chart detailing a method of forming an antenna according to one embodiment.

With reference now to FIGS. 3 and 4, a method of forming one block is described. The (a) and (b) designations for certain elements are omitted as the process may be conducted for any of the base blocks 202.

The method can begin with the formation of a base insulating layer 310 at process 402. The base insulating layer 310 may be formed directly on the wiring layer 310 in one embodiment. In another, the base insulating layer 310 may be formed independent of the wiring layer 310 and the finished block placed on a wiring layer. The base insulating layer may be any type of insulating element. In one embodiment, the base insulating layer is formed of a material used in forming a printed wiring board (PWB) such as a laminate. Such laminates may be formed as is known in the art.

At process 404, a ground plane 240 is formed on top of the base insulating layer. Formation of the ground plane may include electroplating or any other method of forming a metal layer on a laminate. The ground plane may be formed such that in includes one or more holes therein such that connectors as described above may be added thereto.

At process 406 an intermediate insulating layer 360 is formed over the ground plane 240. The layer may be deposited insulator or may be formed of as a laminate layer and combined with heat and pressure. Regardless of how formed, a top surface of the insulating layer may be patterned with radiating and shorting traces 224, 340 arranged as shown and described above at process 408. The upper surface of the intermediate insulating layer 360 is referred to as the second metallization layer above.

At process 410, another (e.g., top) insulating layer 380 is formed. Such a layer may be formed in any of the manners described above. This layer, at process 412 then has a third (top) metallization layer 204 formed thereon. The top metallization layer 204 may be formed such that, when blocks are joined together as shown in FIGS. 2 and 3 a radiating gap 206 is created over the radiating trace 224 and shorting trace 340. In another embodiment, when blocks are joined together as shown in FIGS. 2 and 3 the radiating gap 206 is created over the shorting trace 340 and the radiating trace 224. Also, the metallization layer is formed such that a hole 208 that expose the location where conductor 220 is to be formed (as described below) is left open. The hole 208 may be filled with a dielectric in one embodiment.

At process 414 the different metallization layers/traces are connected by drilling via holes and plating the vias. For example, a shorting via 370 may be formed between the top metallization layer 204 and the shorting trace 340 and conductor 220 may be formed such that it contacts radiating trace 224 and the wiring layer 312. This conductor passes through hole 312 such that it does not make electrical contact with the ground plane 312.

In shall be understood that at least one of the radiating traces, the shorting traces, the base, intermediate, or top insulating layers, the ground plane, or the top metallization layer may be formed by three dimensional printing.

With reference now to FIG. 5, also shown are cage posts 502. The cage posts electrically connect the top metallization layer 204 to the ground plane 240. The cage posts create a shield similar to an outer conductor of a coaxial cable for a particular conductor 220 they surround. As shown, the block includes two conductors 220 (disposed at right angles to one another. The number of cage posts may be different than the four shown surrounding each of the two connectors 220. Additional cage posts may also be included. The cage posts may be formed during process 414 of FIG. 4.

Figure 6:
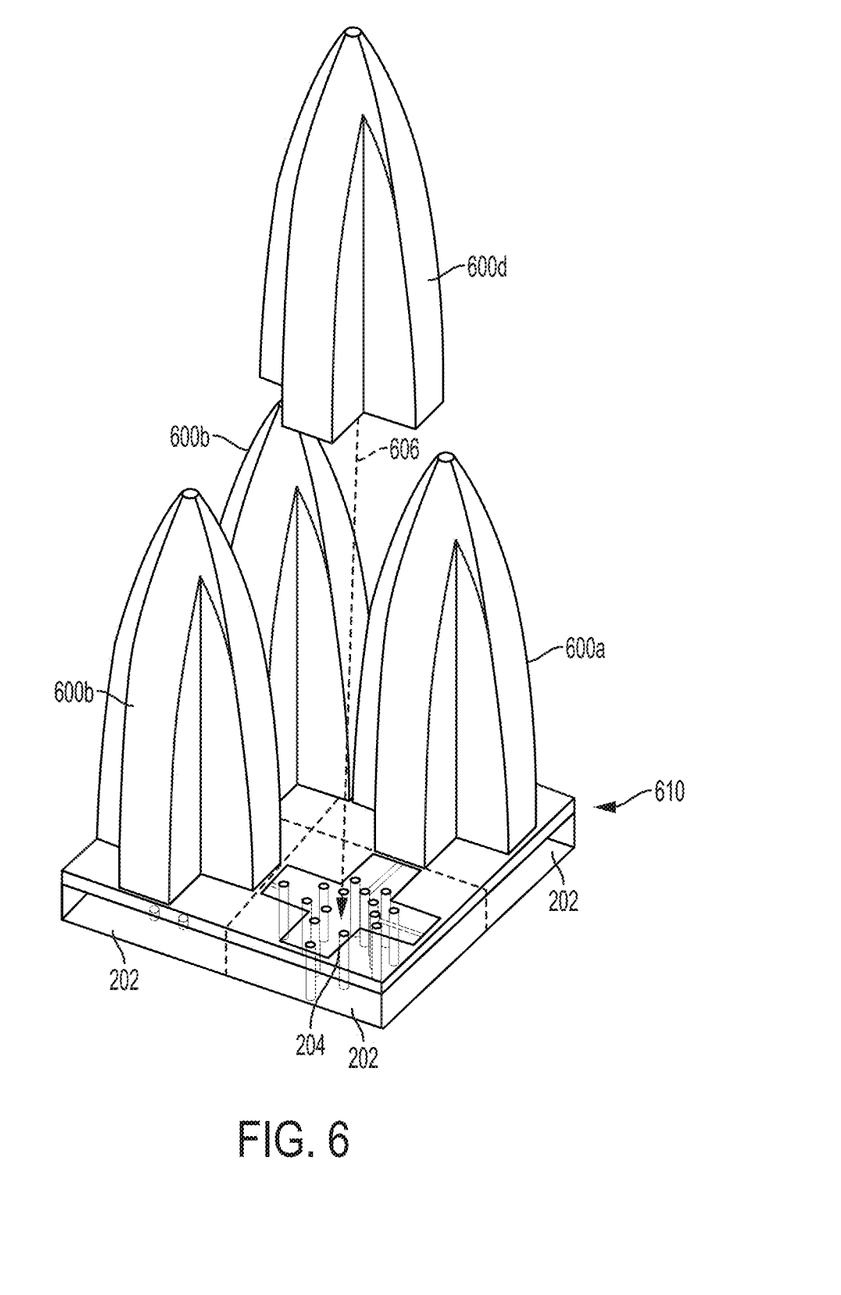
FIG. 6 shows pyramids placed/being placed on a base according to one embodiment.

Referring again to FIG. 4, after the connections/vias have been formed, pyramids may be placed or formed on the top metallization layer at process 416. The placement may be done by a pick a place automated process in one embodiment. For example, in FIG. 6, an antenna 610 has four base blocks 202 on which three pyramids 600a-c have been placed. Pyramid 600d will be placed as indicated by the dashed line 606. In another embodiment, the pyramids may be formed by three-dimensional printing.

Figure 7:
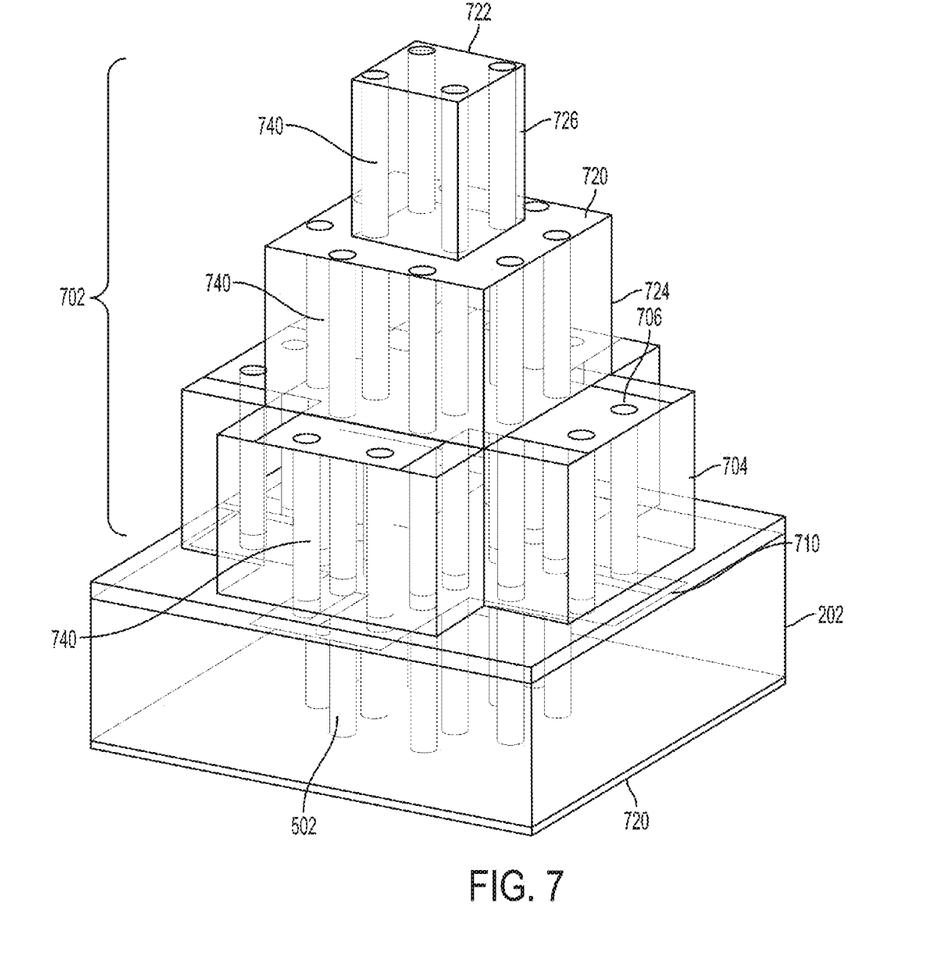
FIG. 7 is a perspective view of an antenna including pyramids formed thereon according to one embodiment.

In another embodiment, rather than being placed, the pyramids are formed. An example of a formed pyramid 702 on a base block 202 is shown in FIG. 7. The base block 202 may be formed as above. The pyramid is formed, by placing a laminate or other first pyramid insulating layer 704 on top of the top metallization layer 710 of the base block 202. This first pyramid insulating layer 704 may include a first pyramid metallization layer 706 formed on top of it. The first pyramid metallization layer 706 may have a same or similar shape as the top metallization layer 710 in one embodiment. After being formed, one or more pyramid connecting vias 740 electrically connect the top metallization layer 710 and the first pyramid metallization layer 706. Additional pyramid metallization layers 720, 722 may also be similarly formed on second and third pyramid insulating layers 724, 726. The shapes of these metallization layers 720, 722 may be chosen to form a step-wise approximation to a particular pyramid shape.

In one embodiment, after the metallization and insulating layers are formed, extra insulating material may be removed to form the general shape shown in FIG. 7. As will be understood, connecting vias 740 may be formed to electrically couple each pyramid metallization layer 706, 720, 724 to each other and to the top metallization layer 710. The combination of the metallization layers and the connecting vias form an outer electrical perimeter of the pyramid 702 that approximates the skin of pyramid as shown in previous figures.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments have been described, it is to be understood that aspects may include only some of the described embodiments. Accordingly, the invention is not to be seen as limited by the foregoing description, but is only limited by the scope of the appended claims.

The invention claimed is:

1. A method of forming a base block of a flare antenna, the method comprising:
   forming a ground plane on a base insulating layer;
   forming an intermediate insulating layer over the ground plane;
   patterning radiating and shorting traces on the intermediate insulating layer, wherein patterning the radiating traces includes patterning a first radiating trace in a first direction and a second radiating traces in a second direction perpendicular to the first direction;
   forming a top insulating layer over the radiating and shorting traces;
   forming a top metallization layer;
   connecting the top metallization layer to the ground plane with vias passing through the intermediate insulating layer; and
   forming a via that contacts the radiating trace and passes through the ground plane and is not in electrical contact with the top metallization layer or the ground plane.

2. The method of claim 1, wherein at least one of the top, base and intermediate insulating layers is a laminate.

3. The method of claim 1, wherein the top metallization does not extend to an edge of the block and the radiating trace does.

4. The method of claim 1, wherein at least one of the radiating traces, the shorting traces, the base, intermediate, or top insulating layers, the ground plane, or the top metallization layer are formed by three dimensional printing.

* * * * *